United States Patent Office 3,343,983
Patented Sept. 26, 1967

3,343,983
PROCESS OF IMPARTING SHRINK RESISTANCE TO WOOL AND THE RESULTING PRODUCT
Walter R. Wszolek, Ellicott City, Md., assignor to W. R. Grace & Co., New York, N.Y., a corporation of Connecticut
No Drawing. Filed Sept. 3, 1964, Ser. No. 394,331
10 Claims. (Cl. 117—141)

This application is a continuation-in-part of application having Ser. No. 343,915, filed Feb. 6, 1964, now abandoned, which in turn is a continuation-in-part of application having Ser. No. 337,742, filed Jan. 15, 1964, now abandoned.

This invention relates to a novel process for shrinkproofing and felt-proofing textile fibers, e.g., wool, in the form of fabric, filament, knit, yarn, woven or mixed goods and the like. The invention further relates to impregnating textile fibers such as wool with a crosslinkable alpha olefin polymeric material in combination with a crosslinking agent for the polymeric material and curing the polymeric material in situ to afford dimensional stability to the textile fibers.

Keratinous fibers such as wool tend to shrink and/or felt during washing thereby destroying to a large extent their commercial value. In the description of this invention the term "felt" refers to that property of such fibers which causes them to close upon each other in washing, or other treatment in aqueous liquor in which the wool material is repeatedly squeezed and rubbed, so that the material becomes denser and more compact. This property of felting is primarily responsible for shrinkage which woolen yarns and fabrics suffer when washed. Thus a commercially acceptable method of shrink-proofing wool without adversely affecting other inherent desirable properties of the material has been a long felt want.

One object of the present invention is to improve the physical characteristics especially the dimensional stability of wool and wool blends while retaining its other inherent properties such as softness of handle. Another object is the treatment of wool and wool-containing blends to reduce their tendency to felt on mechanical working. A further object is the reduction of the tendency of wool and wool blends to shrink on laundering. These and other objects of the invention will be apparent from a reading hereinafter.

The present invention provides a process for forming a crosslinked α-olefin polymeric material on textile fibers such as wool and wool blends which comprises impregnating said fibers with an emulsifiable α-olefin polymeric material in emulsion or solution form in combination with a crosslinking agent for said polymeric material consisting essentially of a polyfunctional compound containing at least 2 alkaline reacting primary amino groups.

The invention still further provides a composition consisting essentially of a textile fiber impregnated with a crosslinked α-olefin polymeric material.

As used herein the term "α-olefin polymeric material" means ethylene homopolymer and copolymers of ethylene and other α-olefins wherein said copolymer contains at least 50 mole percent ethylene. Thus copolymers of ethylene and butylene and ethylene-propylene rubber wherein the copolymers contain at least 50 mole percent ethylene and the balance is an α-olefin are operable in the instant invention. For purposes of description, the invention will be explained in terms of polyethylene as the α-olefin polymeric material unless otherwise noted.

The term "emulsifiable α-olefin polymeric material" herein means ethylene homopolymer, copolymers of ethylene and other α-olefins wherein said copolymer contains at least 50 mole percent ethylene and copolymers of α-olefin monomers and carboxyl containing monomers wherein said copolymer contains at least 50 mole percent ethylene which materials have been either (1) polymerized by emulsion polymerization, or (2) contain 0.1 to 2.0 milliequivalents carboxyl/g. of emulsifiable α-olefin polymeric material. Types of carboxyl containing monomers operable in the instant invention are alpha,beta unsaturated carboxylic acids and their corresponding esters and anhydrides, e.g., acrylic and methacrylic acid, maleic anhydride, diethyl fumarate and the like.

The term "crosslinkable α-olefin polymeric material" as used herein means emulsifiable α-olefinic polymeric material, as defined herein, which has been oxidized until the polymeric material contains 0.1 to 4.0 milliequivalents carbonyl/g. of oxidized α-olefin polymeric material.

Ethylene homopolymer and copolymers of ethylene and other α-olefins wherein said copolymer contains at least 50 mole percent ethylene contain no polar functional groups, such as carboxyl which makes them emulsifiable, and carbonyl which makes them crosslinkable by the instant invention. However oxidation with an oxygen containing gas to the desired degree as taught therein, of the homopolymer or copolymer will affix both carboxyl and carbonyl groups on the homopolymer or copolymer. Thus after oxidation to the required degree, the oxidized polymer or copolymer is both an emulsifiable α-olefin polymeric material and a crosslinkable α-olefin polymeric material as defined herein and is operable for shrink-proofing textile fibers with the crosslinking agent.

Obviously, copolymers of α-olefin monomers and carboxyl containing monomers wherein said copolymer contains at least 50 mole percent ethylene and 0.1 to 2.0 milliequivalents carboxyl/g. copolymer are emulsifiable. However since these copolymers contain only carboxyl groups they must be oxidized in order to optimize and maximize the effects of shrinkproofing of textile fibers by means of the crosslinking reaction taught herein.

Emulsion polymerized polyethylene which contains neither carboxyl or carbonyl groups but which is in emulsion form must be oxidized in order to contain sufficient carbonyl to be operable to shrinkproof textile fibers by means of the crosslinking reaction of the instant invention.

As used in the present invention, unless otherwise specified, the term "emulsion" means a polymer dispersion in which water forms the continuous phase.

By the term "polyfunctional compound" as used throughout this invention is meant a compound containing at least 2 alkaline reacting primary amino (—NH₂) groups or its full equivalent, i.e., a precurser, which decomposes either hydrolytically or thermally under the conditions of cross-linking described herein to form in situ a poly functional compound containing at least 2 alkaline reacting amino (—NH₂) groups. These precursers will be more fully explained hereinafter.

By "alkaline reacting" as used herein is meant that at least two of the amino (—NH₂) groups on the polyfunctional compound are capable of reaction with an equivalent amount of acid.

The above polyfunctional compounds include but are not limited to compounds such as hydrazine, triazine, tetrazane, triazene, guanidine, aminoguanidine, diaminoguanidine, triaminoguanidine, adipic acid dihydrazide, ethylenediamine, 1,2 - propanediamine, 1,3 - propanediamine, hexamethylene diamine, diethylenetriamine, triethylenetetramine, tetraethylenepentamine, o-, m-, or p-phenylenediamine, 1,2,4-triaminobenzene, 1,3,5-triaminobenzene, etc., 2,4-diaminotoluene, 2,4,6-triaminotoluene, etc., 2,4-diaminoanisole, 1,2-diamino-4-nitrobenzene, 1,2-diaminocyclohexane, o-, m-, or p-xylene diamine, 4,4'-diaminodiphenylmethane, 1,8 - diaminonaphthalene, 2,7-diaminonaphthalene, etc., 2,7 - diaminofluorene, 2,4-diamino - n - butyric acid, 2,6-diaminopyridine, 2,4,5,6-tetraaminopyrimidine, 2-hydroxyethyl - 1,4 - diaminobutane, 3,3'-dichloro - 4,4' - diaminodiphenylmethane, carbohydrazide, 1,2 - dihydrazinoethane, 1,4 - dihydrazinobenzene, 2,4 - dihydrazinotoluene, 2,4 - dihydrazino-1-nitrobenzene, terephthaldehyde dihydrazone, 4 - methylisophthalaldehyde dihydrazone, and the like.

It should be pointed out that the crosslinking reaction usually is carried out by adding the polyfunctional compound to the crosslinkable polymer prior to treating the fabric. However, at times it is advantageous to carry out the crosslinking reaction directly in the presence of the substrate to which the polyethylene emulsion or solution is to be applied. For example, it is possible to pre-heat a fabric or a fiber suspension, etc., with an aqueous solution of the polyfunctional compound and subsequently treat said substrate fabric or fiber suspension, etc., with the oxidized crosslinkable polyethylene in emulsion or solution form. In this case, the crosslinking reaction takes place at or near the surface of the substrate and thereby promotes a more intimate, permanent and efficient attachment of the crosslinked oxidized polyethylene to said substrate. It is also possible to reverse this order of treatment, i.e., treat the substrate first with crosslinkable polyethylene and subsequently expose the coated substrate to the polyfunctional crosslinking agent, either in solution or in the vapor phase, etc.

It has also been found that compounds which are precursers of the polyfunctional compounds as described above are operable as crosslinking agents in this invention. By the term "precursers" as used herein is meant any compound or combination of compounds which under the conditions of crosslinking as described herein forms in situ a polyfunctional compound containing at least two alkaline reactive primary amino (—NH₂) groups. Several different types of operable precursers are included in but not limited to the following: (1) mixture of monoprimary amines which interact chemically to form diamines in situ. For example, ethanolamine with an equivalent amount of β-alanine reacts through esterification to form aminoethyl-β-aminopropionate, i.e.,

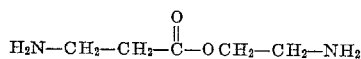

which is an operable polyfunctional compound in the present invention. Another example is an equimolar mixture of allyl amine and 2-mercaptoethylamine which through mercapto addition to the double bond yields

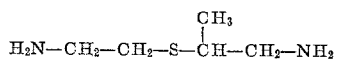

which can serve as an operable crosslinking agent in the instant invention. (2) Compounds which when exposed to the crosslinking conditions of the present invention, decompose thermally or hydrolytically to yield diamines in situ. Examples of such compounds include but are not limited to ethylenediamine carbamate

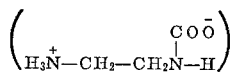

hexamethylenediamine carbamate

N-acetylhexamethylenediamine

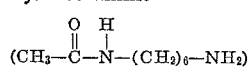

N,N'-diisopropylidene - 1,6 - hexanediamine, N,N'-diisopropylidine hydrazine, N,N'-diacetylhydrazine, N,N'-diacetyl - 1,6 - hexanedioic acid dihydrazide and semicarbazide. (3) Amine salts with organic or inorganic acids. Eethylenediamine hydrochloride, hexamethylenediamine monooleate, hydrazine hydrochloride, hydrazine oleate and hydrazine acetate, etc., are examples of this latter type. An example showing the use of a precurser as a crosslinking agent will be given hereinafter.

Summarily, the present invention provides a method for reducing shrinkage of textile fibers, e.g., wool and wool blends containing 50% by weight wool as raw filament knit, yarn, fabric, woven or mixed goods, which comprises impregnating the fibers with 1 to 25% by weight based on the total weight of the impregnated fibers of a crosslinkable α-olefin polymeric material in emulsion or solution form in combination with 0.05 to 50.0 milliequivalents/milliequivalent of carbonyl in the α-olefin polymeric material after oxidation, of a crosslinking agent consisting essentially of a polyfunctional compound containing at least two alkaline reacting primary amino groups and thereafter curing the crosslinkable α-olefin polymeric material at temperatures in the range 20 to 200° C. When the crosslinkable α-olefin polymeric material is in emulsion form, the crosslinking agent can be added to the textile fiber before, with or after the emulsion of crosslinkable α-olefin polymeric material at temperatures in the range 10–95° C. However, when the crosslinkable α-olefin polymeric material is in solution form, it is necessary that the crosslinking agent be added to the textile fiber prior to or after the solution of crosslinkable α-olefin polymeric material. Admixture of the crosslinking agent and the solution of crosslinkable α-olefin polymeric material prior to addition to the textile fabric causes the polymer to gel in situ and precipitate out of solution.

The invention is particularly suitable for shrinkproofing wool and blends containing at least 50% wool by weight with other natural or synthetic fibers such as polycarbonamides wherein the carbon amide linkage is an integral part of the main polymer chain such as conventional nylon, i.e., "66-nylon" poly (hexamethyleneadipamide) or "6-nylon," i.e., poly (caprioamide) and the like.

By the term "milliequivalents of a polyfunctional compound containing at least 2 alkaline reacting primary amino groups/milliequivalent of carbonyl in the oxidized polyethylene" is meant the number of milliequivalents necessary for a crosslinking reaction, namely one primary-NH₂ group/carbonyl group.

In practicing the crosslinking step where the polyethylene is in emulsion form, it is critical that the polyfunctional compound employed as a crosslinking agent, is not added to the polymer until emulsification of the oxidized polyethylene is complete. The addition of the crosslinking agent prior to or before completion of the emulsification step causes the oxidized polyethylene to crosslink before the polymer particles are sufficiently finely divided to emulsify. Polyethylene which has been crosslinked to a three dimensional network cannot be divided into droplets fine enough to emulsify and form a stable emulsion. Thus the polyfunctional compound used as a cross-linking agent can only be added to the polymer subsequent to its emulsification.

Prior to the crosslinking step, the method by which the polyethylene is oxidized to form the requisite amount of carbonyl in the polymer chain is not critical. Polyethylene can be readily oxidized by various well-known methods to give polymers containing carbonyl groups. The techniques for introducing carbonyl groups into polyethylene are exemplified by but are not limited to the following methods. For example, polyethylene can be milled in ozone and/or air at a temperature in the range 70–200° C. Another method would include passing ozone and/or air into an oven over a solid polyethylene therein at a temperature below the melting point of the polymer, e.g., about 70–135° C. Still another method would be to suspend particles of polyethylene in water or an organic solvent and either bubble air through the suspension or pressurize the system with air at 70–200° C. Yet another method would be to pass ozone and/or air at a temperature below the melting point of the polymer through a fluidized bed of polyethylene particles. A further method would include pressing the polyethylene into film and passing hot air at a temperature of 70–200° C. thereover. In all the aforestated methods of oxidizing polyethylene, if desired, a minor amount, i.e., 0.05 to 5% by weight of an organic peroxide, nitrogen tetroxide or other oxidation catalyst may be blended with the polymer to increase the oxidation rate. The polyethylenes of the instant invention can also be oxidized in the melt.

Another method for introducing carbonyl groups into polyethylene is the reaction of maleic anhydride (or other α,β-unsaturated acids, esters or anhydrides) with polyethylene or telomers thereof; this reaction is promoted by the presence of unsaturated groupings in the polyethylene, or, alternately, can be caused to occur by the use of free radical-forming catalysts such as peroxides, ozone, air, etc., even in the absence of unsaturated groupings in the polyethylene. Such methods are well known to one skilled in the art.

Any of the various well-known types of polyethylene can be used in making crosslinked polyethylene emulsions by the process of this invention. Such polyethylenes include the branched low-density (i.e., about .910 to about .925) material as well as the medium density materials and the newer linear high density (about .950 to .980) materials made by the Ziegler process ($TiCl_4$-Al alkyl catalyst) and the Phillips process (hexavalent chromia on silica-alumina support). The linear polyethylenes having melting points in the range of 120–137° C. and the branched low density polyethylenes having melting points in the range 90–110° C.

The polyethylene of the instant invention can if desired be blended with a paraffin wax before, during or after oxidation and still be operable as cross-linkable polyethylene. Resulting blends of polyethylene and wax usually have densities in the range of 0.85–0.975 g./cc.

In addition polyethylene prepared by an emulsion polymerization process, wherein the ethylene monomer is polymerized at temperatures of 80–140° C. in an aqueous media in combination with an alcohol in the presence of emulsifying agents and a free radical type catalyst such as potassium persulfate, is operable to improve shrinkproofing of wool in the instant invention. Since these emulsion polymerized polyethylenes lack functional groups on the polymer they will not crosslink by the process of the instant invention until subjected to an oxidation. Emulsion polymerized polyethylenes can be oxidized to impart the required carbonyl content to the polymer by subjecting the emulsion to air or oxygen with or without an oxidation catalyst, e.g., an organic peroxide, with agitation at temperatures from 80° to 250° C.

Emulsifiable copolymers of α-olefin monomers and carboxyl containing monomers such as polyethylene and maleic anhydride should also be oxidized if it is desired that they crosslink to the optimum degree by the instant invention. Oxidation of these copolymers can be performed in the melt, solid state or in solution, e.g., benzene or nitrobenzene solvent, with air or other oxygen containing gas with or without catalytic amounts of oxidation promoters such as ozone or an organic peroxide.

It has been found also that α-olefinic copolymers of ethylene are operable in shrinkproofing textile fibers such as wool and wool blends by the process of this invention. Examples of such copolymers are, for instance, ethylene/propylene and ethylene/butylene copolymers. In these ethylene containing copolymers, the units of ethylene are in the range 99.9–50 mole percent of the total monomer unit content of the copolymer. In such copolymers it is not critical to the success of this invention whether the carbonyl-containing groups formed during the oxidation result from attack on the ethylene units or on the comonomer units. In either case the resulting carbonyl groups can be used to crosslink the polymer by the method of this invention.

The general procedure of performing the present invention is to oxidize the polyethylene by one of the aforementioned methods, e.g., admix the polyethylene preferably in particulate solid form, with an organic peroxide (usually 0.1 to 5.0% peroxide by weight of polymer) in a suitable mixing mechanism, e.g., Twin Shell blender at room temperature. Preferably, the organic peroxide is solubilized in a hydrocarbon solvent which solvent is thereafter evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide employed and its inertness thereto. Operable solvents include volatile aromatic and aliphatic hydrocarbons such as benezene, toluene, pentane, hexane and the like.

The thus blended polymer-peroxide mixture is then subjected to oxidation until the required amount of carbonyl is present for the crosslinking reaction and the required amount of carboxyl is present for emulsification. One method of oxidation is to pass ozone and/or air over the mixture while being heated in an oven at temperatures up to the melting point of the polymer. Another method is to pass air, oxygen, or ozone-containing air through a fluidized bed of the polymer-peroxide mixture while maintaining it at a temperature below the melting point of the polymer. Since the rate of oxidation increases with increasing temperature, it is preferred to carry out the oxidation at as high a temperature as possible without melting the polymeric material. Thus temperatures within 20° C. below the melting point of the polymer are usually employed.

The oxidation step can be terminated at any operable degree of oxidation, i.e., within the range 0.1 to 2.0 milliequivalents carbonxyl and 0.1 to 4.0 milliequivalents carbonyl/g. polymer and, if desired, subsequently stabilized. For example, a suitable antioxidant such as 4,4'-thiobis (6,t-butyl-meta-cresol) sold under the trade name Santonox, by Monsanto Chemical Company, or N-phenyl-2-napthyl-amine can be added to the oxidized polymer. However, stabilization of the oxidized polymer is required only to obtain accurate melt index measurements. In actual practice the oxidized polymer is not ordinarily stabilized in making emulsions.

The oxidized polyethylene of the instant invention is readily emulsified in a continuous aqueous phase in the presence of suitable emulsifiers and sufficient base to neutralize the carboxylic acid groups present in the polymer. Both ionic and non-ionic emulsifying agents well known in the prior art are operable to emulsify the oxidized polymer. Ionic emulsifiers include, in the anionic class, amine salts of fatty acids. Morpholine, monoethanol amine, 2-amino - 2 - methyl-1-propanol and the like are suitable amines. Operable fatty acids include oleic, stearic, palmitic, myristic and the like higher fatty caids. Sodium, potassium and ammonium salts of the fatty acids are also operable but are somewhat less satisfactory. Salts of alkyl aryl sulfonic acids have also been used as emulsifying agents with good results. Operable ionic emulsifiers in the cationic class include but are not limited to acetate salts of long chain aliphatic amines. Polyoxyethylene esters of fatty acids, polyoxyethylene derivatives of sorbitans or of fatty acid substituted sorbitans, polyoxyethylene ethers of long chain alcohols, polyoxyethylene ethers of alkyl aryl phenols or combinations thereof are examples of a few nonionic emulsifiers operable in this invention.

The amount of base added to the emulsion ranges from 40% to 200% of the theoretical amount required to neutralize the acid groups on the polymer. When anionic emulsifiers such as amine salts of fatty acids are used, one generally adds an excess of the amine moiety to serve as the base.

The water:oxidized polymer ratio in the prepared emulsion is in the range 80 to 2000:100 parts by weight, preferably, 150 to 1000:100 parts by weight, and can subsequently be diluted or concentrated as desired for any particular end use.

After oxidation, the oxidized polyethylene, emulsifier, base, and water are combined in any order in a pressure reactor equipped with an efficient stirrer. The reactor is sealed and the mixture is heated with vigorous stirring to a temperature ranging from the melting point of the oxidized polyethylene up to 200° C. or more (preferably, 110–160° C.) and maintained thereat for periods ranging from 5 minutes to 6 hours under the pressure of the system. In the case of oxidized low density polyethylene the alternate wax-to-water method of emulsification can be used if desired. In said method, the oxidized low density polyethylene and emulsifier are heated together to about 120° C. The base is added and the resulting mixture is poured into vigorously stirred water at about 90–100° C. for emulsification.

As previously stated it is not necessary that the crosslinkable polyethylene be employed to treat textile fibers in the form of an emulsion. If desired, the polymer can be used to treat the textile fibers in the form of a solution. Polyethylene per se is not sufficiently soluble i.e., less than about 5% in most solvents even at elevated temperature to impregnate a textile fiber uniformly and sufficiently. However after the polymer has been oxidized to the required degree as taught herein the oxidized polymer is sufficiently soluble, i.e., 15 to 60% by wt. in xylene above about 100° C. to impreganate a textile fiber uniformly and sufficiently, i.e., 1 to 25% by wt. of polyethylene based on the total weight of the impregnated fiber. Operable solvents for emulsifiable polyethylene include toluene, n-octane, trichloroethylene and the like if the solvents are heated above about 100° C. Other solvents are well known to those skilled in the art.

For treating the textile fibers in accord with the instant invention, the emulsifiable polyethylene can be added to the fiber in several ways. For example the polymer in emulsion or solution form can be sprayed or brushed on the fiber. Another method would be to immerse the fiber in the emulsion or solution of the polyethylene. Excess liquid can then be removed by heat, evaporation, passage of the impregnated fabric through squeeze rolls, any combination thereof or other well known means. To obtain the shrinkproofing benefits of the instant invention it is necessary that the fabric be impregnated with 1 to 25%, preferably 2–10%, by weight of the polyethylene based on the total weight of the impregnated fabric. Lesser amounts do not afford sufficient shrinkproofing whereas amounts in excess of the upper limit, although operable, impart a weight percent add on in excess of that desired for ordinary commercial use of wool. However in special instances, e.g., if unusual fabric performance (abrasion resistance, solvent or corrosion resistance, etc.) rather than low cost is the overriding consideration, the upper limit may be traversed.

In the shrinkproofing treatment of wood wherein a crosslinking agent is used, the wool can be treated with the crosslinking agent prior to, simultaneously with or subsequent to treatment with the crosslinkable polyethylene emulsion. Where applied alone to the textile fiber either prior to or subsequent to the polyethylene emulsion or solution, the polyfunctional compound is preferably, but not necessarily, added in a liquid medium, e.g., water, to obtain optimum dispersion throughout the fiber.

Thus one method of treating wool with oxidized polyethylene and crosslinking agent is as follows. The polyethylene is oxidized to the required degree in the solid state to form crosslinkable polyethylene in a forced air oven at temperatures up to the melting point of the polymer. The oxidized polymer is then emulsified in a stirred pressure reactor with water, base and conventional emulsifiers at temperatures ranging from the melting point of the polymer up to about 200° C. or more to form emulsions containing 10 to 30% solids. The required amount of polyfunctional compound containing at least 2 alkaline reacting primary amino groups is added to the polyethylene emulsion. Standard wool swatches 5" x 5", marked with ink to form 4¼" x 4¼" squares to facilitate measurements were weighted and immersed in the emulsion until uniformly wetted. The wetted swatches were squeezed through rubber rolls to remove excess emulsion. The thus impregnated swatches were cured by bolting same in a wooden frame without stretching and placing the framed swatches in a forced air oven to cure the polymer on the fabric. The swatches were weighed after curing to determine the percent add on. The area inside the mark area on the swatches was measured and designated as the initial area. The swatches were then washed individually in a one quart friction lid paint can with 6 No. 00 rubber stoppers and 100 ml. soap solution containing 0.2% soap flakes and 0.1% sodium carbonate by weight in distilled water at 50° C. The can was agitated for 15 minutes on a paint can shaker. The swatch was removed from the can, rinsed in warm water and air dried. The dried swatch was then measured for surface area inside the marked portion to obtain percent shrinkage in area. The swatch was then recharged to the container along with another new charge of soap solution for a second 15-minute wash at 50° C. The procedure was repeated a third time in some cases. The swatch is again rinsed, air dried and measured. The percent area of shrinkage is equal to $$100 - \frac{\text{area after washing}}{\text{initial area}} \times 100$$

In other tests the laundering of the wool swatches (12" x 12"), after relaxing the swatches in 0.1% nonionic wetting agent for 1 hour, drying and marking with 10" x 10" squares, was done in an automatic washing machine (delicate fabric setting) having a 4-minute sudsing cycle and a 13-minute rinsing and spin-drying cycle. 30 gms. of detergent sold under the trade name, Tide, by Procter & Gamble Co., was used per wash. The temperature of the wash water (warm setting) was 85–96° F. After washing the swatches were dried in a gas dryer (hot setting) for about 18 minutes at about 185° F. The washing and drying cycle was repeated 10 times with the area of the swatches being measured after the first, fifth and tenth cycle to obtain the percent area of shrinkage.

The amount of polyfunctional compound containing at least 2 alkaline reacting amino groups used for crosslinking in this invention is 0.05 to 50.0, preferably, 0.2 to 20.0, milliequivalents/milliequivalent of carbonyl in the oxidized polyethylene.

The steps of consolidating the polymer and curing the polymer are performed by heating the treated fabric at temperatures in the range 20 to 200° C. In no case should the temperature be so high as to char or detrimentally affect the textile material. For example, with most protein-containing textiles, e.g., wool, temperatures up to 220° C. may be used satisfactorily. Naturally it is understood by those skilled in the art that there is a time-temperature relationship involved; i.e., the lower the temperature the longer the heating period and the higher the temperature the shorter the heating period. Various techniques are operable to perform the consolidation of the polymer and the curing of the treated fabric. For example the treated material can be passed over one or several internally heated rotary drums, through an infrared drier or through a tenter frame drier. Preferably, a tenter frame drier capable of drying the fabric while holding same in a relaxed or in a stretched condition, as desired, is employed. In commercial practice using the tenter frame technique, the treated fabric is maintained in a relaxed or stretched condition in the longitudinal machine direction by the take up roll and in the transverse direction, i.e., in a direction transverse to the machine direction in which the fabric is ultimately wound, by a tenter frame. In the examples herein, wherein swatches of treated fabric are used, the treated fabric was generally clamped between picture-type frames.

In the process where the crosslinking agent is added to the fabric prior to or simultaneously with the oxidized polyethylene, curing need only be practiced following the impregnation with the oxidized polyethylene.

Thus one method to improve shrinkproofing of wool by the crosslinking reaction as taught herein would be to dip the fabric in an aqueous emulsion of oxidized crosslinkable polyethylene, said emulsion containing 0.05 to 50.0 milliequivalents/milliequivalent of carbonyl in the polyethylene, of a polyfunctional compound containing at least 2 alkaline reacting primary amino groups, e.g., hydrazine, followed by curing the fabric at 20° to 200° C. Another method would be to dip the fabric in an aqueous solution of the polyfunctional compound, e.g., hydrazine, followed by immersion of the fabric in the crosslinkable polyethylene emulsion and curing at 20 to 200° C. The invention is also operable if the order is reversed and the fabric is impregnated with the polyethylene emulsion, dried, immersed in an aqueous bath containing the polyfunctional compound and then cured. Another operable method would consist of impregnating the fabric with oxidized, crosslinkable polyethylene in a heated hydrocarbon solvent, e.g., toluene, removing the solvent from the fabric by squeeze rolls, heat, evaporation or other well known means, dipping the dried impregnated fabric in a hydrocarbon or aqueous bath containing the polyfunctional compound and drying at temperatures up to 200° C.

When the crosslinking agent is employed, the oxidized crosslinkable polyethylene is cured in contact with the fabric at temperatures ranging from 20–200° C. with the higher temperature providing the fastest cure. The curing time will vary with such factors as concentration of the polyfunctional compound, curing temperature, wt. percent add on and the like. Curing periods of 5 minutes to 3 hours are operable in the practice of this invention.

The degree of crosslinking can be measured in various ways. One method used herein, of ascertaining the degree of crosslinking is by measuring the melt index of the polymer before and after the crosslinking reaction. Melt index is a measure of polyethylene flow at preset conditions of temperature, pressure, load and time through an orifice of defined diameter and length, all as specified in ASTM D 1238–56T. Since melt index varies inversely with viscosity which varies directly with the degree of crosslinking, a lower melt index after the crosslinking reaction evidences that crosslinking occurred. Another method of measuring the degree of crosslinking in the instant invention is the reduction in the percent carbonyl after the crosslinking reaction. A still further method employed herein to measure crosslinking is to measure the amount of xylene-insoluble polyethylene, i.e., referred to as percent gel content, resulting from the crosslinking reaction.

The following examples are set down to illustrate the invention and are not deemed to limit its scope. Throughout the instant invention tests were conducted as follows:

The extent of oxidation of polyethylene was determined by ascertaining the carboxyl content of the polymeric material by titration with base in the following manner. About 1 g. of the polymer to be analyzed was accurately weighed and dissolved in 100 ml. of xylene by heating to 120–130° C. with stirring in a 500 ml. Erlenmeyer flask on a magnetic stirrer-hot plate. While continuing stirring and maintaining the temperature at 120–130° C., the solution was titrated to a pink end point with standard 0.05 N potassium hydroxide in 30:70 ethanol:xylene using phenolphthalein as indicator.

Calculation:

Milliequivs. COOH per gram =
$$\frac{(\text{ml. of KOH})(N \text{ of KOH})}{\text{g. of polymer}}$$

As an alternate method, the extent of oxidation of the polyethylene was determined by ascertaining the percent carbonyl of the oxidized polymer by measuring the intensity of infrared absorption at 1720 cm.$^{-1}$ assuming an absorbance characteristic of ketone type carbonyl. In actuality, other carbonyl containing functions such as aldehyde, carboxylic acid and carboxylate ester also contribute to the 1720 cm.$^{-1}$ adsorption. Therefore, the values reported as percent carbonyl represent a composite of all of these groups. Measurements were made on a Perkin-Elmer Spectrophotometer, Model 221. The reported percent carbonyl is defined as $$\frac{\text{gms. C=O}}{\text{gms. polymer}} \times 100$$

The viscosity of the polyethylene emulsions were measured at 23° C. with a Brookfield Viscometer Model LVT using Spindle No. 1 at 60 r.p.m.

Melt indices (MI) were measured under the conditions specified in ASTM D 1238–57T under Condition E (melt index i.e., MI) and Condition F (high load melt index, i.e., HLMI).

Densities of the polymer were measured under the conditions specified in ASTM D 1505–57T.

Reduced specific viscosity, i.e., RSV, was obtained by dissolving 0.1 g. of the polymer in 100 cc. Decalin at 135° C. in accord with the procedure of ASTM D 1601–61.

The percent gel content of the polymer in the instant invention were measured by refluxing a weighed treated swatch sample in a cellulose Soxhlet thimble in xylene (containing 0.3 weight percent 2,6-ditertiary-butyl-4-methyl-phenol commercially available under the trade name, Ionol, from Shell Oil Corp.) for 24 hours. The insoluble portion of the sample after drying was weighed to calculate percent gel as follows:

Percent gel =
$$\frac{(\text{wt. treated swatch after extraction} - \text{wt. of untreated swatch})}{(\text{wt. of treated swatch before extraction} - \text{wt. of untreated swatch})} \times 100$$

Unless otherwise noted all parts and percentages are by weight.

*Example 1*

250 lbs. of commercially available polyethylene having a density of 0.95, a melting point of 135° C., a reduced viscosity of 4.5 and a high load melt index of 1.4 was oxidized in air in a ribbon blender for 57 hours at a temperature of 114–118° C. The thus oxidized polyethylene on characterization had a density of 0.99, a melt index of 540 and contained 0.50 milliequivalent of carboxyl/gram of polymer and 0.79 milliequivalent of carbonyl/gram polymer.

*Example 2*

10,000 grams of the thus oxidized polyethylene from Example 1 along with 1800 grams oleic acid, 1750 grams morpholine and 45,000 grams of distilled water were charged to a Patterson Kelly 25-gallon kettle equipped with an air stirrer (64 r.p.m.). The kettle was sealed and vigorous stirring was commenced while the kettle reactor was heated to 150° C. The reactants were maintained at 149–152° C. and about 60 p.s.i.g. for 30 minutes with vigorous stirring. Stirring was continued while the thus formed emulsion was cooled to room temperature. The resulting anionic type emulsion contained 21% solids (17.8% solid oxidized polyethylene) by weight had a viscosity of 7.8 centipoises at 23° C. and a pH of 9.1.

Example 3

400 ml. of the thus formed emulsion from Example 2 were poured into a shallow glass baking dish along with 1.5 milliequivalents of hydrazine per milliequivalent of carbonyl in the oxidized polyethylene prior to emulsification. A standard wool swatch 5 x 5", with a 4¼ x 4¼" square marked thereon to facilitate measurement, was immersed in the emulsion at room temperature, i.e., 25° C. The swatch was then wrung through a set of rubber squeeze rolls, to remove excess emulsion from the swatch. The dipping and wringing operation was repeated one more time. The wool swatch was then clamped between two picture type frames which has 4½" squares cut from their centers. The treated swatch clamped in the frame was inserted into a forced air oven preset at 150° C. and remained therein for 10 minutes to bake the emulsion onto the swatch. The dried swatch was then removed from the frames and weighed. The difference in weight between the treated swatch and the untreated swatch is referred to herein as the wt. percent add on and was 7.1%. The area of the swatch within the markings was remeasured and designated as the initial area. The swatch was then washed individually in a one quart friction lid paint can containing 100 ml. of soap solution and 6 No. 00 rubber stoppers. The soap solution contained 0.2% Ivory soap and 0.1% $Na_2CO_3$ in distilled water. The soap solution was heated to 50° C. at the start of the wash cycle. The can was agitated for 15 minutes on a paint can shaker. The sample swatch was removed from the can, rinsed several times with warm water then hung to dry. The marked area on the swatch showed a 10.8% shrink following the first wash. The swatch was recharged to the can container along with a fresh batch of soap solution and distilled water for a second 15 minute wash at 50° C. The swatch was again rinsed, dried and remeasured. After the second washing the percent shrink was 16.7% in the marked area. A control sample of the same fabric which had not been subjected to the oxidized polyethylene emulsion bath containing hydrazine showed a percent shrink of 49.5% after the first wash and a 57.5% shrink after the second wash.

The following examples in Table I show the effect on shrinkproofing wool of various types of oxidized polyethylene emulsions with a polyfunctional compound crosslinking agent.

The procedure used, unless otherwise noted, was the same as that in Examples 2–3. The polyethylene emulsions were emulsified using emulsifiers of either the anionic, nonionic or cationic type. For anionic emulsification, oleic acid and morpholine were used to form morpholine oleate as in Example 2. For cationic emulsification, high molecular weight imidazolines such as N-hydroxyethyl heptadecenyl imidazoline sold under the trade name, "Geigy Amine O," by Geigy Chemical Corp., and acetic acid were employed. Nonionic emulsification was obtained using polyethylene (6) ether of nonylphenol sold under the trade name, Renex 697, by Atlas Chemical Industries Inc., and KOH.

The desired amount of hydrazine crosslinking agent was added to the emulsion prior to dipping the wool swatch therein unless otherwise noted. After the desired weight percent add on of crosslinking agent and emulsion was cured or baked on the swatches in a forced air oven at 150° C., the swatches were measured and washed as in Example 3.

TABLE I

| Example No. | Emulsifiable Polyethylene—Properties Before Emulsification | | | | Polyethylene Emulsion | | | |
|---|---|---|---|---|---|---|---|---|
| | Density (g./cc.) | RSV | Carbonyl Content (meq./g.) | Carboxyl Content (meq./g.) | Wt. Percent Solids | Viscosity (centipoises) | pH | Emulsifier Type |
| 4 [1] | | | | | | | | |
| 5 | 0.994 | 0.48 | 0.79 | 0.50 | 21.0 | 7.8 | 9.1 | Anionic. |
| 6 | 1.001 | 0.29 | 0.60 | 0.47 | 20.3 | 16.6 | 9.0 | Do. |
| 7 | 1.001 | 0.29 | 0.60 | 0.47 | 23.2 | 8.0 | 9.8 | Nonionic. |
| 8 | 0.994 | 0.48 | 0.79 | 0.50 | 22.2 | 8.0 | 8.8 | Do. |
| 9 | 0.994 | 0.48 | 0.79 | 0.50 | 21.0 | 7.8 | 9.1 | Anionic. |
| 10 | 0.994 | 0.48 | 0.79 | 0.50 | 21.0 | 7.8 | 9.1 | Do. |
| 11 | 0.938 | 0.12 | 0.77 | 0.31 | 21.0 | 7.8 | 9.3 | Do. |

| Example No. | Crosslinking Agent—milliequivalents hydrazine milliequivalents carbonyl | Wt. percent add on of crosslinking agent and/or emulsion solids | Wool Treatment | | | | |
|---|---|---|---|---|---|---|---|
| | | | Baking or Curing | | Area Shrinkage, Percent | | |
| | | | Temp. (° C.) | Time (mins.) | 1st Wash | 2nd Wash | 3rd Wash |
| 4 [1] | 0 | 0 | | | 49.5 | 57.5 | |
| 5 | 1.5 | 7.1 | 150 | 10 | 10.8 | 16.7 | |
| 6 | 2.0 | 6.0 | 150 | 10 | 14.0 | 19.4 | |
| 7 | 1.75 | 8.4 | 150 | 10 | 34.2 | 39.2 | |
| 8 | 1.0 | 8.7 | 150 | 10 | 29.4 | 40.7 | |
| 9 | 1.5 | 9.4 | 150 | 10 | 0.0 | 3.3 | 3.3 |
| 10 | [2] 1.5 | 8.3 | 150 | 10 | 3.3 | 5.6 | 8.9 |
| 11 | 2.0 | 12.1 | 150 | 10 | 11.6 | 27.7 | |

[1] Control run-procedure same as other examples in Table I except no polyethylene emulsion or crosslinking agent added to swatch.

[2] Swatch dipped in hydrazine-containing polyethylene emulsion maintained at 90° C.

Example 12

22.1 pounds of oxidized emulsifiable polyethylene having a density of 0.984, a melt index of 2700 and containing 0.49 milliequivalent of carboxyl and 0.29 milliequivalent carbonyl/g. of emulsifiable polyethylene were charged to a Patterson Kelly 25-gallon kettle equipped with an air stirrer (640 r.p.m.) along with 420 g. acetic acid and 2900 g. of N-hydroxyethyl heptadecenyl imidazoline sold under the trade name, Geigy Amine O. The kettle was sealed. Stirring was commenced while the reactor kettle was heated to 150° C. After 30 minutes at 150° C., the thus formed emulsion was cooled to room temperature with continued stirring. The resulting cationic type emulsion contained 22.9 wt. percent solids, had a viscosity of 9.8 centipoises at 53° C. and a pH of 5.36.

The following examples in Table II show various types, i.e., anionic, cationic and nonionic of oxidized polyethylene emulsions with a polyfunctional compound crosslinking agent which are operable to shrinkproof wool. Unless otherwise noted the crosslinking agent was added to the emulsion at room temperature prior to impregnating the swatch with the emulsion. The procedure used in the examples of Table II was as follows: 400 milliliters of the thus formed emulsion from Example 18 were poured into a glass baking dish along with various amounts of the polyfunctional crosslinking agents as shown in Table II. A wool swatch 12" x 12" was relaxed by soaking for one hour in a 0.1 wt. percent aqueous solution of a polyoxyethylene nonylphenol ether sold under the trade name, Renex 697. The swatch was rinsed and dried without tension, weighed and a 10" x 10" square was marked thereon. The swatch was then dipped in the oxidized polyethylene emulsion containing the crosslinking agent at room temperature (25° C.) and rung out through rubber squeeze rolls. After redipping and rewringing the swatch, it was clamped between two picture type frames having a 10" x 10" square cut from their centers. The clamped swatch was baked in a force air oven for ten minutes at 150° C. The dried swatch was then removed from the frames and reweighed. The wt. percent add on, i.e., difference in weight between the emulsion treated swatch and the relaxed swatch, was then measured. The area of the swatch within the markings was remeasured and designated as the initial area. The swatch was then subjected to 10 washing and drying cycles with measurements to ascertain percent shrink being taken after the first, fifth and tenth cycles. The washing cycle consisted of washing the swatch in a 3-lb. load with 30 g. of a detergent sold under the trade name, Tide, by Procter and Gamble Company and water at 85–96° C. in a Sears, Roebuck automatic washer (Model No. 110–5915610) delicate fabric setting having a sudsing time of 4 minutes in the complete 17-minute washing cycle. The swatch was then dried in a Sears, Roebuck gas dryer (Model 6107502) for 18 minutes (hot setting) at an air temperature of about 84° C. at the dryer exhaust. The marked area on the swatch was then measured after the first cycle, the fifth cycle and the tenth cycle. The hand of the thus washed swatch was then rated. A control wool swatch 12" x 12" with a 10" x 10" marked area which had been relaxed as above but not treated with the oxidized polyethylene emulsion containing the crosslinking agent showed a 6.9% shrink after the first cycle, a 17.7% shrink after the fifth cycle and 25.0% shrink after the tenth cycle. The results of the shrink-proofing examples are shown in Table II.

The ratings for hand were made subjectively, excellent meaning a hand as good as the wool had prior to treatment with ratings of very good, good and acceptable of less hand respectively and a rating of unacceptable being the coarsest, stiffest hand.

The following example shows the operability of the instant invention when the α-olefin polymeric material is in solution form.

*Example 44*

180 grams oxidized crosslinkable polyethylene (MI 540, density 0.99) containing 0.79 milliequivalent carbonyl/g. of polyethylene was dissolved in 400 grams of xylene by heating the mixture of the two components to 110° C. with stirring. To this hot solution was added a swatch (12" x 12") of wool flannel fabric. After 30 seconds the swatch was removed from the bath and the xylene solvent was evaporated from the swatch. After evaporation of most of the solvent, the oxidized crosslinkable polyethylene coated swatch was immersed in a bath of aqueous hydrazine (0.25 g. hydrazine in 100 g. $H_2O$) which was preheated to 70° C. After 1 minute, the swatch was removed, clamped in a picture frame press and placed in an oven at 150° C. for 10 minutes to remove excess solvents from the fabric sample and to complete the crosslinking reaction caused by the hydrazine. The resulting fabric after 10 wash-dry cycles in accord with the procedure used in the examples in Table II, showed a shrinkage of less than 10%.

In practicing this invention it is possible and sometimes desirable without departing from the scope to add fillers, dyes, pigments, protective colloids, antistatic agents, antioxidants, UV inhibitors, and the like to modify the properties of the emulsion and/or the film, coating, laminate, impregnate or polish resulting from application of said emulsion. The above additives could be added prior to the emulsification step, but in most instances would be added to the finished emulsion, either before or after addition of the crosslinking agent. In addition, additives such as textile softeners can be added to the treated fabric after consolidation or curing.

*Example 45*

200 parts of oxidized polyethylene having a density of 0.994, an RSV of 0.48 and containing 0.79 milliequivalent carbonyl and 0.50 milliequivalent carboxyl/g. polymer were charged to a Patterson Kelly 25 gallon kettle equipped with an air stirrer along with 62 parts of a nonionic emulsifier, i.e., Renex 697, 7.8 parts of a 32% KOH

TABLE II

| Example No. | Emulsifiable Polyethylene | | | | Polyethylene Emulsion | | | |
|---|---|---|---|---|---|---|---|---|
| | Properties Before Emulsification | | | | Wt. percent Solids | Viscosity (centipoises) | pH | Emulsifier Type |
| | Density (g./cc.) | RSV | Carbonyl Content (meq./g.) | Carboxyl Content (meq./g.) | | | | |
| 13 [1] | | | | | | | | |
| 14 | 0.994 | 0.48 | 0.79 | 0.50 | 20.3 | 7.8 | 9.1 | Anionic.[2] |
| 15 | 0.994 | 0.48 | 0.79 | 0.50 | 22.2 | 8.0 | 8.8 | Nonionic.[3] |
| 16 | 0.994 | 0.48 | 0.79 | 0.50 | 21.0 | 7.8 | 9.1 | Anionic.[2] |
| 17 | 0.994 | 0.48 | 0.79 | 0.50 | 21.0 | 7.8 | 9.1 | Do. |
| 18 | 0.994 | 0.48 | 0.79 | 0.50 | 21.0 | 7.8 | 9.1 | Do. |
| 19 | 0.994 | 0.48 | 0.79 | 0.50 | 21.0 | 7.8 | 9.1 | Do. |
| 20 | 0.938 | 0.12 | 0.78 | 0.31 | 21.0 | 7.8 | 9.3 | Do.[5] |
| 21 | 0.984 | 0.4 | 0.75 | 0.40 | 22.1 | 7.1 | 9.3 | Nonionic.[3] |
| 22 | 0.948 | 0.21 | 0.61 | 0.33 | 20.4 | 7.4 | 9.3 | Anionic.[2] |
| 23 | 0.948 | 0.21 | 0.61 | 0.33 | 20.4 | 7.4 | 9.3 | Do. |
| 24 | 0.981 | 0.77 | 0.58 | 0.35 | 15.0 | | | Do. |
| 25 | 0.981 | 0.77 | 0.58 | 0.35 | 10.0 | | | Do. |
| 26 | 0.981 | 0.77 | 0.58 | 0.35 | 7.5 | | | Do. |
| 27 | 0.994 | 0.48 | 0.79 | 0.50 | 14.0 | | | Do. |
| 28 | 0.994 | 0.48 | 0.79 | 0.50 | 15.7 | | | Do. |
| 29 | 0.994 | 0.48 | 0.79 | 0.50 | 10.5 | | | Do. |
| 30 | 0.948 | 0.32 | 0.62 | 0.30 | 19.1 | 64.1 | 9.3 | Do. |
| 31 | 0.948 | 0.32 | 0.62 | 0.30 | 19.1 | 64.1 | 9.3 | Do. |
| 32 | 0.984 | 0.40 | 0.75 | 0.47 | 22.0 | 7.0 | 9.3 | Nonionic.[3] |
| 33 | 0.984 | 0.40 | 0.75 | 0.47 | 22.0 | 7.0 | 9.3 | Do. |
| 34 | 0.994 | 0.48 | 0.79 | 0.50 | 11.0 | | | Do. |
| 35 | 0.994 | 0.48 | 0.79 | 0.50 | 21.0 | 7.8 | 9.1 | Anionic.[2] |
| 36 | 0.994 | 0.48 | 0.79 | 0.50 | 14.5 | | | Do. |
| 37 | 0.994 | 0.48 | 0.79 | 0.50 | 10.5 | | | Do. |
| 38 | 0.994 | 0.48 | 0.79 | 0.50 | 10.5 | | | Do. |
| 39 | 0.994 | 0.48 | 0.79 | 0.50 | 10.5 | | | Do. |
| 40 [1] | | | | | | | | |
| 41 [8] | | | | | | | | |
| 42 [9] | 0.994 | 0.48 | 0.79 | 0.50 | 21.0 | 7.8 | 9.1 | Anionic. |
| 43 | 0.990 | 0.40 | 0.78 | 0.47 | 22.0 | 6.3 | 9.9 | Nonionic. |

See footnotes at end of table.

TABLE II—Continued

| Example No. | Crosslinking Agent | | Wt.percent add on of crosslinking agent and/or emulsion solids | Wool Treatment | | | | | Remarks |
|---|---|---|---|---|---|---|---|---|---|
| | Compound | Meq./meq. carbonyl | | Baking or Curing | | Area Shrinkage, percent | | | |
| | | | | Temp. (° C) | Time (mins.) | 1st Wash | 5th Wash | 10th Wash | |
| 13 [1] | | | 0 | | | 6.9 | 17.7 | 25.0 | |
| 14 | Hydrazine | 1.5 | 13.3 | 150 | 10 | 0.0 | 0.0 | 1.0 | >10% gel. |
| 15 | ---do--- | 1.0 | 17.1 | 150 | 10 | 0.0 | 0.0 | 0.0 | >20% gel. |
| 16 | ---do--- | 1.5 | 4.6 | 150 | 10 | 1.0 | 1.0 | 6.5 | >8% gel. |
| 17 | ---do--- | 1.5 | 4.0 | 150 | 10 | 2.0 | 4.5 | 7.0 | |
| 18 | ---do--- | [6] 1.5 | 8.0 | 150 | 10 | 0.0 | 2.5 | 6.9 | >10% gel. |
| 19 | ---do--- | [7] 1.5 | 8.5 | 150 | 10 | 0.0 | 3.0 | 3.5 | >15% gel. |
| 20 | ---do--- | 1.9 | 9.4 | 150 | 10 | 3.0 | 6.9 | 18.4 | |
| 21 | ---do--- | 1.5 | 11.5 | 150 | 10 | 0.0 | 1.0 | 2.0 | >15% gel. |
| 22 | ---do--- | 1.5 | 8.7 | 150 | 10 | 2.0 | 5.5 | 5.9 | >8% gel. |
| 23 | ---do--- | 3.0 | 9.7 | 150 | 10 | 1.0 | 5.0 | 7.2 | Hand-Excellent. |
| 24 | ---do--- | 1.5 | 8.5 | 150 | 10 | 1.0 | 3.5 | 4.5 | Do. |
| 25 | ---do--- | 1.5 | 4.9 | 150 | 10 | 0.5 | 5.0 | 6.2 | Do. |
| 26 | ---do--- | 1.5 | 4.6 | 150 | 10 | 1.5 | 6.2 | 6.9 | Do. |
| 27 | ---do--- | 1.5 | 6.4 | 150 | 10 | 2.5 | 4.0 | 5.0 | Do. |
| 28 | ---do--- | 1.5 | 8.1 | 150 | 10 | 1.0 | 4.0 | 5.9 | Do. |
| 29 | ---do--- | 3.0 | 4.4 | 150 | 10 | 2.5 | 3.7 | 7.2 | Do. |
| 30 | ---do--- | 1.5 | 10.7 | 150 | 10 | 0.0 | 4.0 | 5.5 | Do. |
| 31 | ---do--- | 6.0 | 9.0 | 150 | 10 | 1.6 | 4.0 | 4.5 | Do. |
| 32 | ---do--- | 3.0 | 6.4 | 150 | 10 | 4.0 | 4.6 | 6.0 | Do. |
| 33 | ---do--- | 3.0 | 10.3 | 150 | 10 | 0.0 | 3.5 | 4.7 | Do. |
| 34 | ---do--- | 1.0 | 6.4 | 150 | 10 | 0.0 | 4.5 | 4.0 | Do. |
| 35 | ---do--- | 1.5 | 9.3 | 150 | 10 | 5.9 | 6.2 | 6.2 | Do. |
| 36 | Adipic Dihydrazide | 1.5 | 9.3 | 150 | 10 | 4.0 | 7.9 | 8.2 | Do. |
| 37 | Ethylenediamine | 1.5 | 7.2 | 130 | 10 | 4.2 | 9.0 | 8.0 | Do. |
| 38 | Hydrazine | 1.5 | 6.5 | 100 | 20 | 6.2 | 11.0 | 12.6 | Do. |
| 39 | ---do--- | 1.5 | 6.8 | 25 | 60 | 6.4 | 8.9 | 12.2 | Do. |
| 40 [1] | ---do--- | 0 | 0 | | | 11.7 | 19.2 | 28.0 | Do. |
| 41 [8] | | 0 | 0 | | | 9.0 | 16.5 | 23.0 | Do. |
| 42 [9] | Hydrazine | 1.5 | 9.7 | 150 | 10 | 3.2 | 4.1 | 5.0 | Do. |
| 43 | "Diak #2" [4] | 2.0 | 10.3 | 150 | 10 | 4.1 | 4.7 | 5.5 | Do. |

[1] Control run-procedure same as other examples in Table II except no polyethylene emulsion or crosslinking agent added to swatch.

[2] Anionic emulsion formed by combining 200 parts oxidized polyethylene, 36 parts oleic acid, 35 parts morpholine and 900 parts water in a stirred ½ gallon pressure reactor. Reactor was sealed and air evacuated. Stirring was started and mixture at 150-152° C. for 30 min. with stirring followed by cooling through reactor coils.

[3] Nonionic emulsion prepared by same procedure as in ([2]) using 200 parts oxidized polyethylene, 62 parts of a polyoxyethylene nonylphenol ether sold under the tradename "Renex 697" by Atlas Chemical Industries Inc., 29 parts of a 32% aqueous KOH solution and 900 parts water as reactants.

[4] Crosslinking agent was a precurser of a polyfunctional compound, i.e., ethylenediamine carbamate sold under the trademark "Diak #2" by E. I. duPont de Nemours & Co.

[5] Anionic emulsions in Example 20 prepared with the reactants in ([2]) using the conventional wax to water technique, i.e., oxidized polyethylene and oleic acid melted in resin kettle at 120-130°, morpholine added thereto and the resultant melt at 115-125° C. poured rapidly into water at 95-99° C. with stirring.

[6] Swatch dipped in aqueous hydriazine solution (1.6 ml./400 ml. distilled water), wrung out and then dipped in polyethylene emulsion followed by curing.

[7] Swatch dipped in polyethylene emulsion, wrung out, baked 10 min. at 150° C., dipped in aqueous hydrazine solution (1.6 ml./400 ml. distilled water), wrung out and cured 10 mins. at 150° C.

[8] Control run-using swatch of 80% wool and 20% nylon blend procedure same as in other examples in Table II except no polyethylene emulsion or crosslinking agent added to swatch.

[9] Swatch was 80% wool and 20% nylon blend as in Example 41.

solution and 900 parts water. The kettle was sealed and stirred commenced while the kettle was heated to 150° C. After 30 minutes at 150° C. and 55 p.s.i.g. the reactor was cooled with continued stirring. The resultant emulsion contained 22.2% solids. The emulsion had a viscosity of 8.0 centipoise and a pH of 8.8. 190 ml. of the emulsion was poured into a glass dish and 1.2 ml. hydrazine (3.0 meq./g. carbonyl) was added to the emulsion with stirring. A weighed wool swatch was dipped into the emulsion and then cured for 10 minutes at 150° C. The cured dry swatch on reweighing showed a 15.6 wt. percent add on. The swatch was characterized for gel content in refluxing xylene for 24 hours. The swatch had a gel content of 26.3%.

*Example 46*

250 lbs. of commercially available polyethylene having a density of 0.955, a melting point of 135° C., a reduced viscosity of 4.5 and a high load melt index of 1.8 was oxidized in air in a ribbon blender for 50 hours at a temperature of 118° C. The thus oxidized polyethylene on characterization had a reduced specific viscosity of 0.44 and contained 0.80 milliequivalent of carbonyl/gram of polymer and 0.47 milliequivalent of carboxyl/gram of polymer.

*Example 47*

To a 2-quart Chemco stirred reactor equipped with a high sped air stirrer was charged 450 parts water, 100 parts of oxidized polyethylene from Example 63, 6.8 parts of a 32% KOH solution and 31 parts of a non-ionic emulsifier, i.e., a polyoxyethylene nonylphenyl ether sold under the trade name, Renex 697, by Atlas Chemical Industries, Inc. Air was evacuated from the reactor and the reactor was sealed. Vigorous stirring was commenced and the reactor was heated to 150° C. The mixture was maintained at 150-152° C. and 55 p.s.i.g. for 30 minutes with vigorous stirring. Stirring was continued while the thus formed emulsion was cooled to room temperature. The resulting stable emulsion contained 22.4% solids. The starting oxidized polyethylene was shown to be 99% emulsified when filtered through a 100-mesh screen at 25° C.

*Example 48*

200 milliliters of the thus formed polyethylene emulsion from Example 47 were poured into a shallow glass baking dish along with 2.4 milliliters of hydrazine (6.0 eq.) and 150 milliliters of distilled water. A standard wool swatch (Montgomery Ward fabric Catalog No. 16C4829) 12" x 12" was immersed in the emulsion at room temperature. The swatch was then wrung through a set of rubber squeezed rolls, to remove excess emulsion from the swatch. The immersion and wringing operation was repeated one more time. The wool swatch was then clamped in a picture-type frame and dried in a forced air oven preset at 150° for 10 minutes to cure the emulsion onto the swatch. The percent add on of emulsion was 4.7%. The area of the swatch within the markings of the picture-type frame were remeasured and designated as the initial area. The swatch was then subjected to ten washing and drying cycles with measurements to ascertain percent shrink being taken after the tenth cycle. The washing cycle consisted of washing the swatch in a 3-lb. load with 30 grams of a detergent manufactured by Procter and Gamble Co. under the trade name, Tide, and water at 85–96° C. in a Sears, Roebuck automatic washer (Model 110-5915610) using the delicate fabric setting having a sudsing time of four minutes in the complete 17-minute washing cycle. The swatch was then dried in a Sears, Roebuck gas dryer (Model 6107502) for 18 minutes (hot setting) at an air temperature of about 84° C. at the dryer exhaust. The marked area on the swatch had a 0.5% shrink after the tenth washing and drying cycle. The hand of the thus washed swatch was not affected by the herein described treatment. A control wool swatch of the same material 12" x 12" with a 10" x 10" marked area had been processed as above but not treated with the oxidized polyethylene emulsion showed a 25% shrink after the tenth washing and drying cycle.

The process of the invention is particularly adapted to the treatment of wool, but is also advantageously applicable to other textiles including mohairs; animal hair; silk; fibers made from proteins such as casein, peanut protein, soybean, protein, keratins, etc.; cotton; regenerated cellulose; viscous; linen; cellulose acetate, etc. The textile material may be in the form of fibers, threads, yarns, woven or knitted fabrics, garments, etc.

What is claimed is:

1. An impregnated textile article capable of being cured to provide a shrink-resistant textile of substantially unimpaired hand consisting essentially of wool impregnated with 1–25% by weight based on the total weight of the impregnated wool of a cross-linkable α-olefin polymeric material containing 0.1 to 4.0 milliequivalents carbonyl/g. crosslinkable material in combination with 0.05 to 50.0 milliequivalents of a polyfunctional compound containing at least 2 alkaline reacting primary amino groups/milliequivalent carbonyl in the crosslinkable α-olefin polymeric material.

2. The impregnated textile article of claim 1 wherein the polyfunctional compound is hydrazine and the cross-linkable α-olefin polymeric material is a member of the group consisting of emulsion polymerized ethylene homopolymer, ethylene homopolymer, copolymers of ethylene and other α-olefins wherein said copolymers contain at least 50-mole percent ethylene and copolymers of α-olefin monomers and carboxyl-containing monomers wherein said copolymers contain at least 50-mole percent ethylene.

3. Shrink resistant impregnated wool article of substantially unimpaired hand comprising wool carrying an —NH₂ cured deposit of 1–25% by weight of an alpha-olefin polymeric material containing prior to curing 0.1 to 4.0 milliequivalents carbonyl per gram of said material with an amount of a polyfunctional compound containing at least 2 alkaline reacting primary amino groups sufficient to provide 0.05–50.0 —NH₂ groups per carbonyl group in the alpha-olefin polymeric material.

4. The impregnated wool article of claim 3 wherein the wool is a blend containing up to 20% nylon by weight.

5. The process of imparting shrink resistance to wool without substantially impairing its hand which comprises impregnating wool with 1 to 25% by weight based on the total weight of the impregnated wool of a crosslinkable α-olefin polymeric material containing 0.1 to 4.0 milliequivalent carbonyl/g. oxidized material in combination with 0.05 to 50.0 milliequivalents of a polyfunctional compound containing at least 2 alkaline reacting primary amino groups/milliequivalent carbonyl in the crosslinkable α-olefin polymeric material and curing the thus impregnated wool at a temperature of 20 to 200° C.

6. The process according to claim 5 wherein the crosslinkable α-olefin polymeric material is a member of the group consisting of emulsion polymerized ethylene homopolymer, ethylene homopolymer, copolymers of ethylene and other α-olefins wherein said copolymers contain at least 50-mole percent ethylene and copolymers of α-olefin monomers and carboxyl-containing monomers wherein said copolymers contain at least 50-mole percent ethylene.

7. The process according to claim 5 wherein the crosslinkable α-olefin polymeric material is in the form of an emulsion.

8. The process according to claim 5 wherein the wool is impregnated at a temperature above about 100° C. with the cross-linkable α-olefin polymeric material in the form of a solution.

9. The process according to claim 5 wherein the polyfunctional compound is hydrazine.

10. The process of claim 5 wherein the wool is a blend containing up to 20% nylon by weight.

References Cited

UNITED STATES PATENTS

| | | | |
|---|---|---|---|
| 2,678,286 | 3/1954 | Bruner et al. | 117—141 |
| 2,766,214 | 10/1956 | Erchak et al. | |
| 2,928,816 | 3/1960 | Chapman et al. | |
| 3,178,309 | 4/1965 | Harding | 117—141 X |

WILLIAM D. MARTIN, *Primary Examiner.*

T. G. DAVIS, *Assistant Examiner.*